March 15, 1949.  A. H. GEE  2,464,496
SURGICAL DISPENSER
Filed July 23, 1945
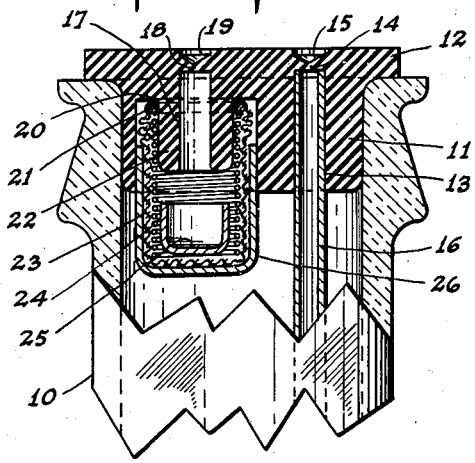
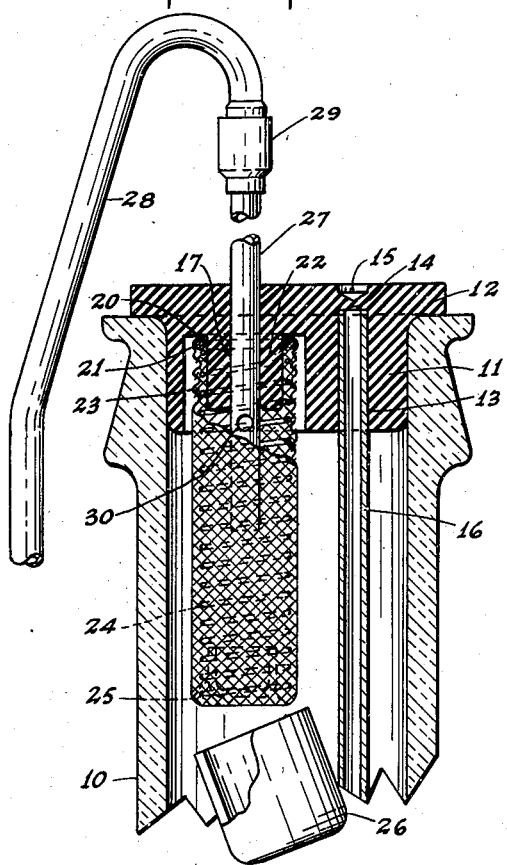
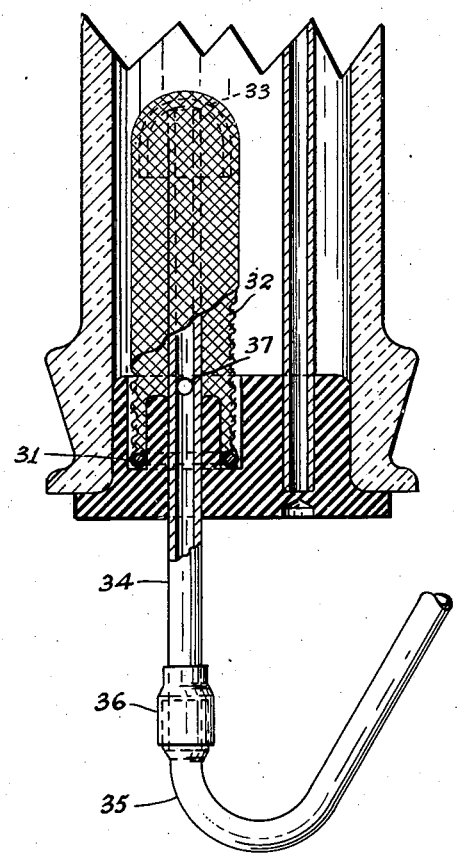
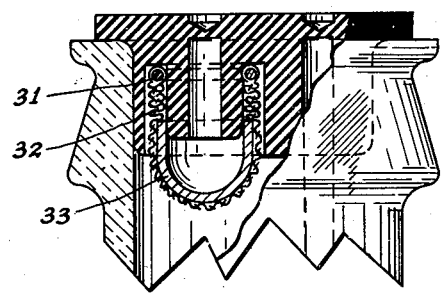
INVENTOR.
Albert Haldane Gee
BY
ATTORNEY Patented Mar. 15, 1949

2,464,496

UNITED STATES PATENT OFFICE 2,464,496

SURGICAL DISPENSER

Albert Haldane Gee, New York, N. Y., assignor, by mesne assignments, to William R. Warner & Co., Inc., New York, N. Y., a corporation of Delaware Application July 23, 1945, Serial No. 606,492

4 Claims. (Cl. 210—170)

1

This invention relates to blood transfusion apparatus and more particularly to strainers for such apparatus which function to remove clots and other solid material from the blood as it flows from the containers to the vein of a recipient.

In the indirect transfusion of whole blood, strainers are essential for the removal of solid matter from the blood despite the incorporation of anticoagulants which retard but do not entirely check the thrombotic processes. Heretofore difficulties have been encountered in the practical use of these strainers largely because clots tend to fill the interstices of the filter when disposed in the tubular connecting equipment and fittings outside of the containers. The limited space usually available in such fittings so restricts the available filtering area that the filters soon become clogged and must be periodically replaced causing undesirable interruptions in the transfusion process. Moreover, when exterior to the bottle the filters must be separately housed and sterilized and are difficult to assemble and maintain free from contamination.

Further difficulties sometimes occur when clots from within the vessel cause stoppages in the outlet passage before the blood reaches the external filter. This is particularly true of blood which is not administered immediately following collection. The restriction which inevitably forms must be removed from the outlet passage before the transfusion can be completed causing undesirable and sometimes painful delays in the operation.

The principal object of the present invention is to provide apparatus of the indicated type which will be free of the disadvantages mentioned above and in which the strainer is mounted within and forms a part of the container for the blood to be administered.

A further object of the present invention is to provide an apparatus for collecting and administering whole blood wherein the filter is inoperatively disposed free of the container contents while the blood is stored in the container.

Another object of the present invention is to provide a blood filter of sufficient dimensions to avoid clogging during the period in which the container is emptied.

Another object of the invention is to provide a blood collecting and administering apparatus in which the filter is entirely enclosed within the container but protected from the contents when inoperative.

Another object of the present invention is to

2 provide a filtering device for a blood container which may be sterilized simultaneously with the container.

Another object of the present invention is the provision of a blood strainer which is extended to the maximum filtering area by the insertion of an instrument into the container for withdrawing the fluid contents.

Another object of the present invention is to provide an apparatus in which the strainer automatically moves to the fully operative position in preparing the equipment for dispensing blood from the container.

Other objects and advantages of the invention will become apparent to those skilled in the art from the following detailed description of specific embodiments of the invention which are to be considered merely illustrative and not in limitation of the invention the scope of which is defined by the claims.

For a more complete understanding of the invention reference may be had to the accompanying drawings in which Figure 1 is an elevation partly in section of a container mouth showing the strainer in an elevated position; Figure 2 is a similar view of the same container showing a fluid withdrawal instrument inserted in the closure and the strainer in operative position; Figure 3 is a fragmental section of a modified type of strainer and Figure 4 shows the same strainer moved to an operative position.

The invention in general comprises a receptacle provided with a stopper which carries a collapsible strainer, means for holding the strainer in retracted position and means operable through said stopper for extending the strainer to an operative position.

As shown more particularly in Figure 1 the apparatus of the present invention comprises a container 10 of the type generally employed for collecting and administering fluids provided with a stopper 11 formed of rubber or other plastic deformable material. The stopper 11 includes a body portion which snugly fits in the open neck of the container 10 and an outwardly extending flange 12 which seats on the upper end of the container mouth, the construction of the stopper with relation to the container neck being such that it hermetically seals the contents of the container prior to use. The stopper 11 is provided with an opening 13 which extends from the inner end of the stopper to a point near the outer surface of the stopper where it is closed by a relatively thin wall 14 which separates the opening from a depression 15 formed within the top of the stopper. A vent tube 16 is frictionally held within the opening 13 for a purpose which will be later described.

A third blind opening (but not shown) of the type provided by the elements 13, 14, and 15 can be provided in the stopper so as to enable the initial filling of the container with blood as it is collected from a donor.

The stopper 11 has a further opening 17 provided therein which extends to a point below the upper surface of the stopper as shown in Figure 1 which is closed by a thin wall 18 which separates the opening from an indentation 19 formed in the top of the stopper.

A circular groove 20 is formed in the body of the stopper 11 substantially concentric with the opening 17 and which terminates at a point well within the body of the stopper. The circular groove 20 receives a retaining ring 21 which tightly engages the body of the compressible rubber-like material 22 formed by the groove 20 so as to support a collapsible strainer 23 which may be formed of cotton fabric or nylon or other suitable material.

Contained within the strainer 23 is a coil spring 24, the upper portion of which circumscribes the body of rubber-like material 22 while the lower end thereof engages the bottom of the strainer 23. A small cup shaped member 25 rests on the bottom of the strainer 23 and is enclosed by the lower portion of spring 24.

As shown in Figure 1 the strainer and associated elements are enclosed and held in retracted position by means of a thimble 26 the open end of which frictionally engages the outer wall of the groove 20 formed in the lower face of the stopper. When the strainer is in the retracted position the coil spring 24 is held under a degree of compression which alone is insufficient to break the frictional engagement which the thimble 26 has with the groove 20 in the lower face of the stopper. It will be appreciated that when so retracted the strainer is maintained well above the level of fluid in the container so that there is small likelihood for the filter surface becoming wetted with blood from within the container. Moreover, the thimble 26 in addition to inoperatively supporting the strainer in an elevated position serves as a shield for protecting the filter against any blood which might otherwise accidently be splashed against the lower surface of the stopper.

In using the container thus far described the stopper after being applied to the mouth of the container as shown in Figure 1 is punctured through the third opening (not shown) with a suitable instrumentality for the collection of blood from a donor. After the container has been partially filled the needle or other instrument is removed from the opening in the stopper which seals closed on removal of the needle by virtue of the thin wall section associated therewith.

When it is desired to administer the blood which has been collected in the container, a fluid withdrawal instrumentality, for example a cannula 27 after puncturing the thin wall 18 with a sharp instrument is inserted in the fluid withdrawal opening 17 into engagement with the bottom of the cup 25 until the thimble 26 has been moved out of frictional engagement with the groove 20 in the bottom of the stopper. One end of the cannula 27 is secured to a rubber tube 28 which in turn connects the container with a suitable needle which is inserted into the vein of the recipient. A short section of rubber hose 29 firmly secures tubing 28 to the end of the cannula and protects the same against the entrance of contamination. The opposite end of the cannula is provided with one or more openings 30 through which the blood communicates with the tubing 28 after passing through the filter 23.

When the thimble 26 is disengaged from the groove 20 in the bottom of the stopper 11 the coil spring 24 expands to move the strainer into the operative position as shown in Figure 2. At the same time the thin wall 14 above the vent tube 16 may be ruptured to provide access of air to the vessel and thereby permit withdrawal of fluid. The container may then be inverted and the transfusion carried out in the customary manner. The strainer is supported in its fully extended position throughout the period blood is draining from the container so that the maximum filtering surface is presented during the transfusion.

Figure 3 shows a modified form of strainer 32 supported in the grooved portion of the stopper by a retaining ring 31 and containing a cup shaped member 33 secured to the bottom of the strainer 32 so as to frictionally engage the body of rubber-like material 22 when the strainer is inoperatively disposed. When fluid is to be dispensed from the container, the thin stopper diaphragm is punctured and a cannula 34, secured to a rubber hose 35 by a tubing section 36 and having an outlet 37, is inserted into the fluid withdrawal opening of the stopper to break the frictional engagement between the cup 33 and the body of rubber-like material 22 and extend the strainer 32 for dispensing the container fluid to a patient to the position shown in Figure 4. A somewhat longer cannula is used with the modification of Figures 3 and 4 because the spring is omitted from the strainer 32.

The advantages conveniently achieved by virtue of the invention will be apparent from the foregoing and many changes may be made from the explanatory embodiments given herein within the scope of the invention as defined by the claims.

I claim:

1. A dispensing container provided with a stopper having means through which an outlet tube may be inserted, a collapsible strainer between the container contents and said tube inserting means affixed to the under surface of said stopper, means depending from said under surface of said stopper and surrounding said tube inserting means for holding said strainer in retracted position, said holding means being positioned so that upon insertion of said outlet tube through said tube inserting means, it will be disengaged from said stopper, thereby permitting said strainer to move from a retracted to an extended position.

2. A dispensing container provided with a stopper having means through which an outlet tube may be inserted, a collapsible strainer between the container contents and said tube inserting means, a groove in the under surface of said stopper surrounding said tube inserting means, means frictionally engaging said groove in said stopper holding the strainer in retracted position and being positioned so that upon insertion of an outlet tube through said tube inserting means, it will be disengaged from frictional engagement with said stopper, thereby permitting the strainer to move from a retracted to an extended position.

3. A dispensing container provided with a stopper having means through which an outlet tube may be inserted, a collapsible strainer between the container contents and said tube inserting means, a spring within said strainer tending to move the strainer into an extended position, a groove on the under surface of said stopper surrounding said tube inserting means, means frictionally engaging said groove for holding said spring and strainer in a contracted position and being positioned so that insertion of an outlet tube through said tube inserting means will remove said holding means from frictional engagement with the stopper and thereby force the strainer into extended position.

4. A dispensing container provided with a stopper having means through which an outlet tube may be inserted, a collapsible strainer between the container contents and said tube inserting means, a groove in the under surface of said stopper surrounding said tube inserting means, means disposed within said strainer and frictionally engaging the inner walls of said groove so as to hold the strainer in retracted position, said holding means being positioned so that upon insertion of an outlet tube through said tube inserting means, it will be disengaged from frictional engagement with the stopper and the strainer thereby moved into an extended position.

ALBERT HALDANE GEE.

REFERENCES CITED

The following references are of record in the file of this patent:

UNITED STATES PATENTS

| Number | Name | Date |
| --- | --- | --- |
| 248,843 | Bower | Nov. 1, 1881 |
| 1,696,313 | Liddell | Dec. 25, 1928 |
| 2,186,440 | Williams | Jan. 9, 1940 |
| 2,212,318 | Gee | Aug. 20, 1940 |
| 2,315,109 | Cutter | Mar. 30, 1943 |
| 2,341,114 | Novak | Feb. 8, 1944 |
| 2,435,820 | Diggs | Feb. 10, 1948 |

FOREIGN PATENTS

| Number | Country | Date |
| --- | --- | --- |
| 622 | Great Britain | 1853 |